Patented May 29, 1945

2,377,040

UNITED STATES PATENT OFFICE 2,377,040

DERIVATIVES OF FLUORENE CARBOXYLIC ACIDS

George Rieveschl, Jr., and Francis Earl Ray, Cincinnati, Ohio, assignors to The Wm. S. Merrell Company No Drawing. Application May 22, 1942, Serial No. 444,114

2 Claims. (Cl. 260—472)

This invention relates to new compounds which are of value as therapeutic agents, particularly as antispasmodics and local anesthetics.

The new compounds of the invention are aminoalcohol esters of fluorene carboxylic acids and related compounds in which the two hydrogen atoms of the bridging methylene group are replaced by oxygen.

These new compounds may be represented by the formula

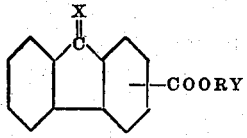

in which X represents an oxygen atom, R represents an alkylene group and Y represents a nitrogen-linked amino group, usually tertiary, which may include two alkyl groups or alicyclic groups or even aryl groups linked to the nitrogen, or which may be a heterocyclic structure, such as a piperidino structure. The esters in which the amino group is a primary or secondary amino group, with the nitrogen linked to hydrogen or to hydrogen and an alkyl, alicyclic or aryl group are included within the invention, but in general, such compounds do not show the high therapeutic activity of the esters of the tertiary aminoalcohols referred to.

The new compounds may be prepared in the form of the free base, or in the form of salts, such as the salts with mineral acids including the hydrogen halides, phosphoric acid, etc., as well as the salts with organic acids, such as acetic acid, phenyl acetic acid, etc.

Most of the new compounds are crystalline, particularly in the form of their hydrochlorides, and have relatively high melting points, i. e., around 200° C. Most of the hydrochloric acid salts are soluble in alcohol and water and insoluble in ethyl ether. In color they range from white through orange.

The carboxyl group in the new compounds may be linked to the fluorene radical by replacement of any of the eight phenyl hydrogen atoms, that is, may be in any of the positions 1 through 8. The compounds in which the carboxyl group is in the 1, 2 or 4 (5, 7 or 8) position are particularly useful and are readily prepared.

The esters are advantageously produced by reaction of the carboxylic acid chloride with the selected aminoalcohol, with the formation of the ester. Esters of aminoalcohols in which the amino nitrogen is tertiary are prepared with particular ease by this procedure.

A wide range of aminoalcohols may be used in the preparation of the new products; and, of course, the invention includes the new esters of these aminoalcohols. Among the aminoalcohols which may be used are the following:

2-piperidino-ethanol
3-piperidino-propan-1-ol
2-piperidino-propan-1-ol
3-piperidino-propan-1,2-diol
Diethylamino-ethanol
3-diethylamino propanol
2-diethylamino-propanol
Dibutylamino-ethanol
3-dipropylamino-propanol
2-dipropylamino-propanol
Cyclohexylethylamino-ethanol
Cyclopentylethylamino-ethanol
3-ethylhexylamino-propanol
3-ethylpentylamino-propan-1,2-diol
Phenylethylamino-ethanol In general, it is advantageous that the alkylol group have two or three carbon atoms, and one or two hydroxy groups, but compounds in which the alkylol group has more than three carbon atoms, e. g., is a butanol or isobutanol group, may be used to produce new compounds within the scope of the broader aspects of the invention.

Similarly, it is advantageous that, where tertiary aminoalcohols are used, the radical or radicals linked to the nitrogen (other than the alkylol radical) have a total of from four to eight carbon atoms. In those compounds in which a single radical is doubly linked to the nitrogen, forming a heterocyclic ring structure, the ring structure advantageously has four to eight carbon atoms (piperidino, methylpiperidino, etc.); in those in which two separate radicals are linked to the nitrogen (dialkyl, alkyl-alicyclic) the total number of carbon atoms in the two radicals is advantageously from four to eight (dibutyl, diethyl ethylcyclohexyl, etc.). Although the esters of the tertiary aminoalcohols have important advantages for therapeutic purposes, the invention includes the esters of primary and secondary aminoalcohols, such as hexylaminoethanol, aminobutanols, cyclohexyl- and cyclopentyl-aminoethanols and propanols, etc.

The new compositions of the invention are advantageously produced from the carbonyl chloride of the corresponding fluorenone carboxylic acid. Fluorenone-2-carboxylic acid is readily prepared from fluorene, which may be more or less crude, by acetylating the fluorene, as by treatment with aluminum chloride and acetic anhydride, and oxidizing the resulting 2-acetyl fluorene to the corresponding fluorenone carboxylic acid. Fluorenone-1-carboxylic acid is prepared by the oxidation of fluoranthene, as with chromic acid, to fluorenone-1-carboxylic acid, while fluorenone-4-carboxylic acid may be prepared by heating diphenic acid with concentrated sulfuric acid. Fluorenone-3-carboxylic acid may be prepared from 3-amino fluorenone by the Sandmeyer reaction, i. e., by diazotizing and then heating with cuprous potassium cyanide.

These acids are readily converted to the corresponding chloride, from which the keto-esters may be produced by reaction with the amino-alcohol.

The invention will be further illustrated by the following specific examples, but it is not limited thereto (all parts by weight).

*Example 1.*—Beta - diethylaminoethyl fluorenone-2-carboxylate hydrochloride. 80 parts of crude fluorene (M. P. 100-107° C.) were placed in a reaction vessel equipped with a stirrer, reflux condensers and dropping funnel and were dissolved in 450 parts of carbon disulfide. Aluminum chloride (113 parts) was added and the mixture was stirred until homogeneous. Acetic anhydroide (38 parts) was then added drop-wise over a period of about 45-55 minutes. The reaction mixture was stirred while heating on a water bath for an additional hour. The precipitate was then filtered, washed with carbon disulfide to remove unreacted fluorene and highly colored impurities, and was then dried, after which it was hydrolyzed by adding it in portions to a stirred mixture of 800 parts of water containing 30 parts of concentrated hydrochloric acid. The use of ice during this hydrolysis should be avoided. The hydrolyzed product comprising crude 2-acetylfluorene was filtered and dried. About 100-110 parts of crude 2-acetylfluorene having a melting point of about 113-119° C. were obtained. This product was sufficiently pure for subsequent oxidation to fluorenone-2-carboxylic acid.

The entire yield of 2-acetylfluorene prepared as described above was placed in a reaction vessel and dissolved in 650 parts of glacial acetic acid. Following this, 450 parts of commercial sodium dichromate were added in small portions to the hot solution. The reaction was vigorous at first. About 45 minutes were required for complete addition of the sodium dichromate. The mixture was then refluxed while adding 200 parts of acetic anhydride drop-wise over the course of about 90 minutes following which the mixture was refluxed for an additional six hours. At the end of this period, the hot contents of the flask were poured into a large quantity of hot water, while stirring vigorously, with the production of a yellow precipitate which was filtered and then washed with water containing a small amount of sulfuric acid to remove chromium salts. The washed filter cake was mixed with 700 parts of a hot 5% solution of potassium hydroxide and was filtered while hot to remove alkali-insoluble material. The filtrate was treated with 10 parts of an activated charcoal (Darco) for a period of 20 minutes and was then filtered twice. Precipitation of fluorenone-2-carboxylic acid from the filtrate was then carried out slowly, and with vigorous stirring, at a temperature of about 80-90° C. The bright yellow precipitate of fluorenone-2-carboxylic acid was washed with hot water, and was dried. The yield was about 30 parts. The alkali-insoluble material, separated as described above, consisted essentially of 2-acetylfluorenone which may be further converted to the carboxylic acid by adding it to the next batch of 2-acetylfluorene to be oxidized or by oxidizing it in a separate operation. By either of these procedures for the conversion of such unreacted acetylfluorenone, about 53-57 parts of fluorenone-2-carboxylic acid are obtained from 80 parts of crude fluorene. The pure acid was obtained by recrystallization from acetic anhydride and melted with sublimation at 340° C.

The corresponding acid chloride was then prepared by refluxing 22.4 parts of the fluorenone-2-carboxylic acid prepared as described above and 400 parts of purified thionyl chloride. The acid dissolved with the production of a clear yellow solution. After two hours of refluxing the free thionyl chloride was distilled off as completely as possible on the water bath. The fluorenone-2-carbonylchloride separated in golden yellow crystals which were placed in a Buchner funnel for the removal of the remaining thionyl chloride by suction. The yield of fluorenone-2-carbonylchloride was 24.4 parts, representing almost a 100% yield, and its melting point was 174-176° C. Upon recrystallization from benzene, fluorenone-2-carbonylchloride was obtained having a melting point of 183-184° C.

12.2 parts of this fluorenone-2-carbonyl chloride and 160 parts of benzene were heated on a water bath until solution was complete. 6.0 parts of beta-diethylaminoethyl alcohol diluted with 35 parts of benzene were then added by means of a dropping funnel while stirring constantly. The addition of the alcohol was completed in 15 minutes. The ester hydrochloride separated out as the mixture was stirred and heated for an additional 90 minutes. After cooling, the mixture was filtered and the filter cake was washed with ether. About 18.0 parts of beta-diethylaminoethyl fluorenone-2-carboxylate hydrochloride, representing almost 100% yield, were obtained. The ester hydrochloride was purified by dissolving it in methanol with an activated charcoal (Darco) and recrystallizing. The pure beta-diethylaminoethyl fluorenone-2-carboxylate hydrochloride had a melting point of 223-224° C.

*Example 2.*—Beta - diethylaminoethyl fluorenone-1-carboxylate hydrochloride. 25 parts of fluoranthene in 600 parts of glacial acetic acid was heated to 60° C. A mixture of 85 parts of chromic anhydride ($CrO_3$), 75 parts of water and 25 parts of glacial acetic acid was added so that the temperature rose and remained between 85° and 90° C. When the reaction appeared to be complete the mixture was poured into 4000 parts of water and the product was purified by dissolving it in 10% potassium hydroxide, stirring with charcoal, filtering and acidifying. A second purification of the acid, using barium carbonate, yielded a product melting at 191-193° C. 15.4 parts of fluorenone-1-carboxylic acid was obtained. On recrystallization from glacial acetic acid bright orange crystals melting at 193-194° were obtained.

The corresponding acid chloride was prepared by heating this acid with thionyl chloride. This product was then reacted with beta-diethylaminoethanol, as described for fluorenone-2-carbonyl chloride, to give beta-diethylaminoethyl fluorenone-1-carboxylate hydrochloride, melting at 194–195°.

*Example 3.*—Beta - diethylaminoethyl fluorenone-4-carboxylate hydrochloride. 10 parts of diphenic acid was heated with 25 parts of concentrated sulfuric acid to 130° C. and maintained at this temperature for 10 minutes. After cooling to 50° C. it was poured into 500 parts of water. The wet acid was then dissolved in 150 parts of water containing 10 parts of potassium hydroxide. The solution was filtered and the fluorenone-4-carboxylic acid was precipitated by acidifying the filtrate. It melted at 224–225° C. On recrystallization from ethyl alcohol it melted at 227° C. Fluorenone-4-carbonyl chloride was prepared in the same manner as described for fluorenone-2-carbonyl chloride, and was converted to beta-diethylaminoethyl fluorenone-4-carboxylate hydrochloride by treatment with beta-diethylaminoethanol as described for the ester of fluorenone-2-carboxylic acid. It melted at 197–198° C.

Included among the compounds which may be prepared by the procedures indicated above, and which are included within the scope of the invention, are the following:

Beta - diethylaminoethyl-fluorenone-1-carboxylate hydrochloride, M. P. 194–195° C.
Gamma - diethylamino-n-propyl-fluorenone-1-carboxylate hydrochloride, M. P. 159–160° C.
Beta - diethylaminoethyl-fluorenone-2-carboxylate hydrochloride, M. P. 223–224° C.
Gamma - diethylamino-n-propyl-fluorenone-2-carboxylate hydrochloride, M. P. 220–221° C.
Beta - di-n-butylaminoethyl-fluorenone-2-carboxylate hydrochloride, M. P. 179–180° C.
Beta - diethylamino - beta - methyl-ethyl-fluorenone-2-carboxylate hydrochloride, M. P. 209–210° C.
Gamma - diethylamino-beta-hydroxy-n-propyl-fluorenone-2-carboxylate, M. P. 208–211° C.
Gamma-piperidino-beta-hydroxy-n-propyl-fluorenone-2-carboxylate hydrochloride, M. P. 225–227° C.
Beta - piperidino-ethyl-fluorenone-2-carboxylate hydrochloride, M. P. 232–235° C.
Gamma - di-n-butylamino-n-propyl-fluorenone-2-carboxylate hydrochloride
Beta - diethylaminoethyl-fluorenone-4-carboxylate hydrochloride, M. P. 197–198° C.
Gamma - diethylamino-n-propyl-fluorenone-4-carboxylate hydrochloride, M. P. 210–211° C.

We claim:
1. Beta - diethylaminoethyl fluorenone-2-carboxylate hydrochloride.
2. Compounds of the formula

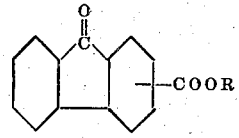

in which R is the carbon-linked radical of an amino alcohol.

GEORGE RIEVESCHL, Jr.
FRANCIS EARL RAY.